(12) United States Patent
Roblin et al.

(10) Patent No.: US 11,554,551 B2
(45) Date of Patent: Jan. 17, 2023

(54) CALIBRATING THE FOCUS OF A POWER RADIATION SOURCE OF AN ADDITIVE MANUFACTURING DEVICE

(71) Applicant: AddUp, Cebazat (FR)

(72) Inventors: Alexandre Roblin, Cebazat (FR);
Jean-Pierre Nicaise, Cebazat (FR);
Ivan Novikoff, Cebazat (FR)

(73) Assignee: ADDUP, Cebazat (FR)

( * ) Notice: Subject to any disclaimer, the term of this patent is extended or adjusted under 35 U.S.C. 154(b) by 200 days.

(21) Appl. No.: 16/624,577

(22) PCT Filed: Jun. 19, 2018

(86) PCT No.: PCT/EP2018/066274
§ 371 (c)(1),
(2) Date: Dec. 19, 2019

(87) PCT Pub. No.: WO2018/234312
PCT Pub. Date: Dec. 27, 2018

(65) Prior Publication Data
US 2020/0122404 A1    Apr. 23, 2020

(30) Foreign Application Priority Data
Jun. 19, 2017 (FR) ........................ 1755572

(51) Int. Cl.
*B29C 67/00* (2017.01)
*B29C 64/393* (2017.01)
(Continued)

(52) U.S. Cl.
CPC ............ *B29C 64/393* (2017.08); *B22F 10/20* (2021.01); *B29C 64/268* (2017.08); *B33Y 50/02* (2014.12); *B22F 10/30* (2021.01)

(58) Field of Classification Search
CPC ........ B22F 10/20; B22F 10/30; B29C 64/268; B29C 64/393; B33Y 50/02
See application file for complete search history.

(56) References Cited

U.S. PATENT DOCUMENTS 5,832,415 A    11/1998   Wilkening et al.
6,175,413 B1    1/2001   Lucas
(Continued)

FOREIGN PATENT DOCUMENTS

| | | |
|---|---|---|
| CN | 101823181 A | 9/2010 |
| DE | 10 2015 224 963 B3 | 4/2017 |
| EP | 1 048 441 A1 | 11/2000 |

OTHER PUBLICATIONS

International Search Report dated Jun. 29, 2018, in corresponding PCT/EP2018/066274 (5 pages).

*Primary Examiner* — Ryan M Ochylski
(74) *Attorney, Agent, or Firm* — Venable LLP

(57) ABSTRACT

An assembly for calibrating a head system of a power radiation source of an additive manufacturing apparatus comprises: a calibration plate comprising a plurality of reference marks, and a firing medium made of at least one material that is sensitive to the radiation of the source, this medium leaving visible the reference marks of the calibration plate when it is in place on the latter, characterized in that the firing medium comprises a plurality of windows that are distributed so as to be superposed with the various reference marks of the calibration plate and to leave said marks visible when the firing medium is in place on the calibration plate. There is also a method for calibrating such a system.

11 Claims, 11 Drawing Sheets

(51) Int. Cl.
  *B33Y 50/02* (2015.01)
  *B29C 64/268* (2017.01)
  *B22F 10/20* (2021.01)
  *B22F 10/30* (2021.01)

(56) References Cited

U.S. PATENT DOCUMENTS

| | | |
|---|---|---|
| 6,483,596 B1 | 11/2002 | Philippi et al. |
| 2003/0192868 A1 | 10/2003 | Dietrich et al. |
| 2010/0176539 A1 | 7/2010 | Higashi et al. |
| 2012/0139166 A1 | 6/2012 | Abe et al. |
| 2014/0333931 A1 | 11/2014 | Lu et al. |
| 2015/0100149 A1 | 4/2015 | Coeck et al. |
| 2018/0290242 A1 | 10/2018 | Blaschka et al. |
| 2019/0047228 A1 | 2/2019 | Brown |
| 2020/0215759 A1 | 7/2020 | Roblin et al. |

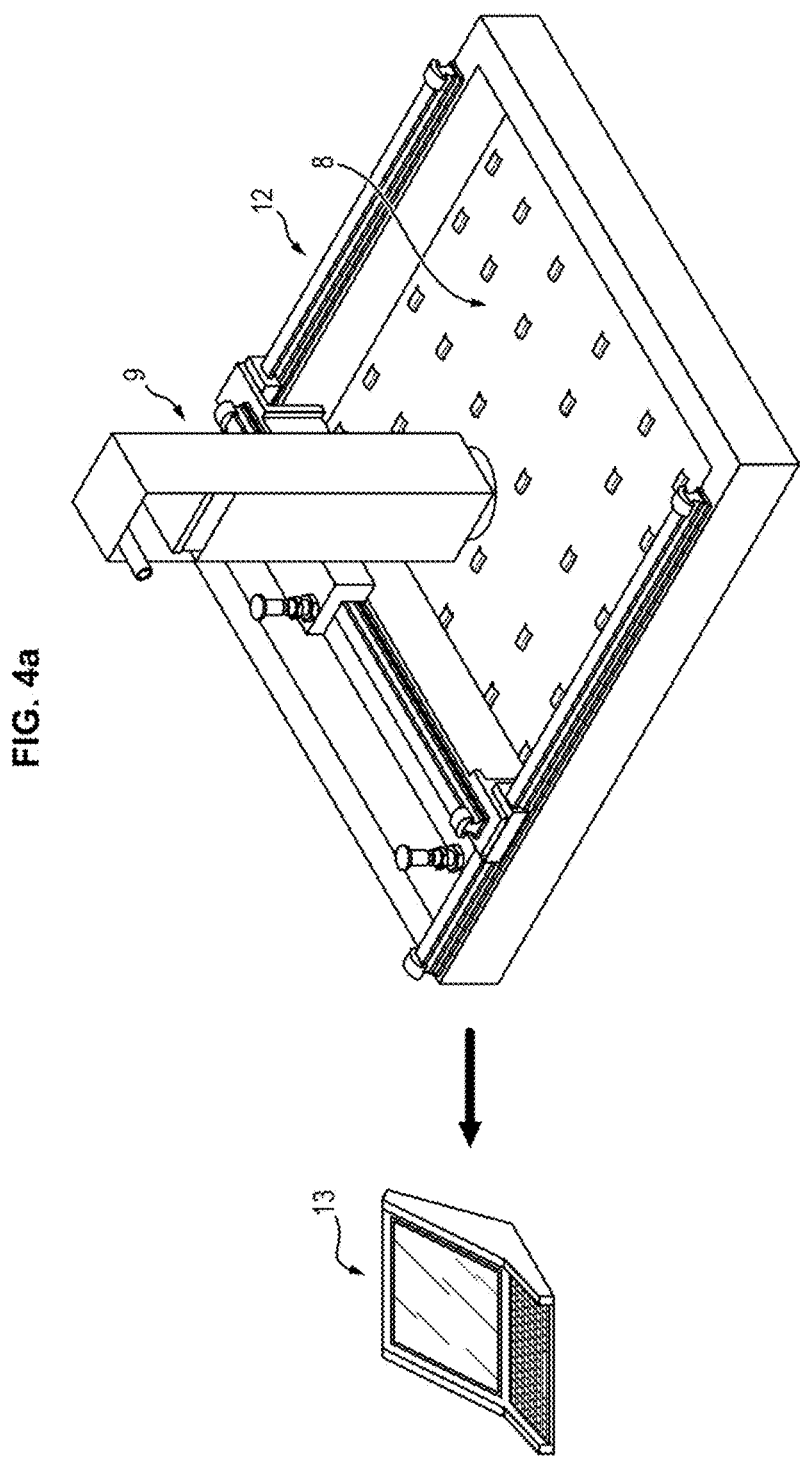

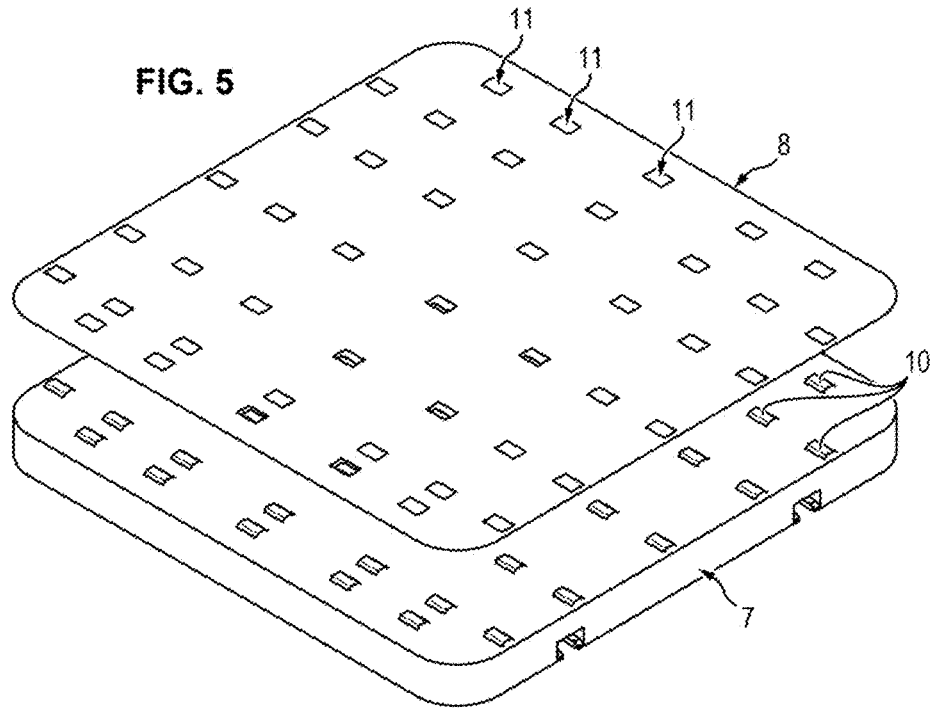
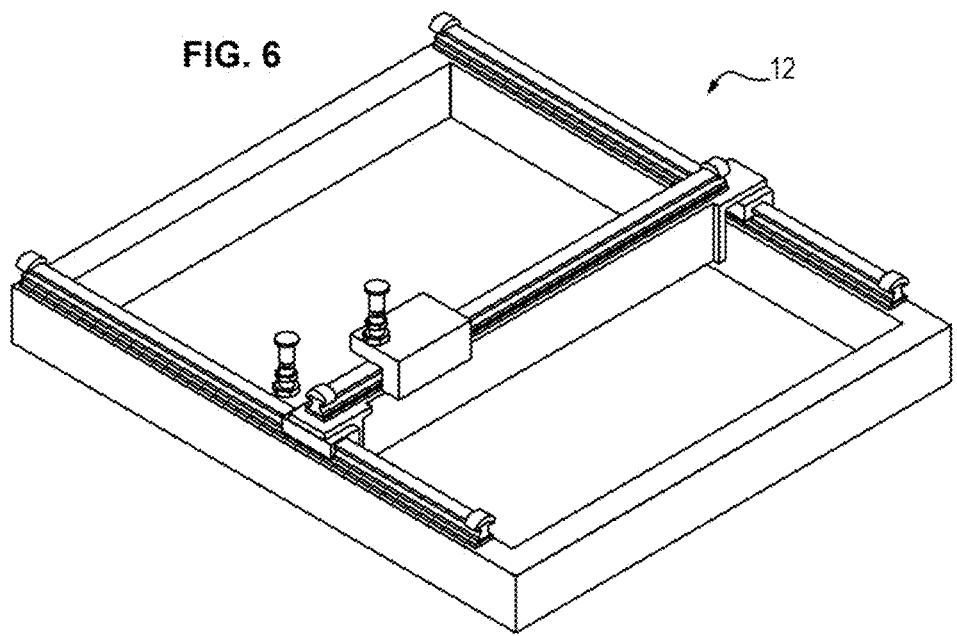

CALIBRATING THE FOCUS OF A POWER RADIATION SOURCE OF AN ADDITIVE MANUFACTURING DEVICE

The present invention relates to selective additive manufacturing.

More particularly, it relates to the calibration of the focus of a power radiation source of an additive manufacturing apparatus.

GENERAL TECHNICAL FIELD AND PRIOR ART

Selective additive manufacturing consists in producing three-dimensional objects by consolidating selected zones of successive strata of pulverulent material (metal powder, ceramic powder). The consolidated zones correspond to successive sections of the three-dimensional object. The consolidation is achieved, layer by layer, by partial or complete selective fusion carried out with a focused radiation source, such as an optical source (high-power laser for example), or even a source that generates a particle beam (for example an electron beam—technology called EBM or "Electron Beam Melting").

Reference is made below mainly to optical sources (such as used in SLM or "Selective Laser Melting" technologies).

It is however applicable to any other type of radiation.

Conventionally, as illustrated in FIG. 1, optical-source additive manufacturing apparatuses use three-axis head systems S employing three galvanometers in order to allow on the one hand an enhanced precision of the position of the impact point on the layer of pulverulent material, and on the other hand the beam to be focused on said layer.

Two galvanometers 1, 2 are used to guide two mirrors 3, 4 rotationally and to allow the path of the beam output from the head to be controlled, in order to control the positioning of the point of impact of the beam on the powder bed (work plane P) (command in X and in Y).

Moreover, a DFM ("Dynamic Focusing Module")—comprising a galvanometer, a translating module and a lens—allows, by virtue of the translation of said lens, the focal length of the beam to be perfectly adjusted to the powder bed (command in Z). In FIG. 1, an objective module 6 that introduces a set focus has also been shown, the DFM 5 allowing the focus to be adjusted being located upstream.

Specifically, it will be understood that the more the laser beam is correctly focused on the powder bed, the higher and better controlled the energy transmitted to the fusion point.

Nevertheless, it will be noted that such a three-axis head system S leads to two main types of deformation at the powder bed (plane P).

Firstly, the focus at the working plane P where the powder bed is located varies depending on the inclination of the optical beam. Specifically, as illustrated in FIG. 2, the inclination of the beam results in variations in optical path length (schematically shown by $\Delta Z$ in the figure), these variations themselves adding to effects due to the play induced by the mirrors or even by the passage through the various windows that may be provided in the additive manufacturing apparatus.

In the absence of processing to correct this geometric offset, the focus will therefore not be constant in all of the working plane P.

Moreover, a non-linear deformation in X and in Y of the patterns of the points of impact (so-called "pillow-shaped" deformation—shape PS in FIG. 3) is conventionally observed in the working plane P. This deformation is due to the geometry of the optical path, and in particular to the position of the mirrors and optics and to their distance with respect to the plate P.

It is conventionally known to correct the commands of the heads in order to take into account the distortions in X and in Y.

To this end, tables of dedicated corrections that are determined beforehand are used.

These tables provide command differentials with which the command inputs of the three-axis head are corrected. The working plane P is thus shot and scanned by the optical beam with positions in X and Y that are corrected with respect to the powder bed.

It is known, to determine these correction tables, to use calibration plates that bear reference marks. Sequences of optical shots are fired at preset target positions of the plate. A camera-based measurement system notes the position of these markings with respect to the reference marks.

The differentials between the positions of the markings thus produced on the calibration plate and the firing positions that were theoretically targeted are used to compute the corrections to be applied to the commands in X and in Y of the optical-beam head system.

In this respect one example is for example described in patent EP1048441 or even in patent applications US2015/0100149 and US 2014/0333931.

In EP1048441 in particular, on the one hand a plate bearing the reference marks and on the other hand a sheet intended to receive the markings are used for the calibration.

To this end the plate is divided into two zones: one that receives the sheet sensitive to the optical beam, the other—which is not covered by said sheet—bearing the reference marks.

Patent application CN 101 823 181 proposes to determine the focus of a laser beam via discrimination of the morphology of optical shots.

However, the proposed processing operations certainly do not allow the focus of the beam on the powder bed to be optimized.

Furthermore, the corrections made in X and in Y are not optimal.

Of course, as will be easily understood, similar calibration issues also arise with other radiation sources (EBM source for example).

GENERAL PRESENTATION OF THE INVENTION

One aim of the invention is to provide an automatic calibration solution allowing the correction of the shooting to be optimized.

In particular, one aim of the invention is to provide a solution allowing the focus of the source (calibration in Z) to be calibrated.

Another aim of the invention is to provide a calibration solution allowing a better calibration in X and in Y than in the prior art.

Thus, according to one aspect, the invention provides a method for calibrating a head system of a power radiation source of an additive manufacturing apparatus in which, to determine a correction to be applied to the commands of said system, the following steps are implemented:

positioning in the additive manufacturing apparatus a calibration plate comprising a plurality of reference marks, commanding the source to mark on the calibration plate at least one calibration pattern formed of a plurality of impact points, acquiring at least one image of said calibration pattern and of at least one reference mark, determining at least one corrected command depending on the one or more images thus obtained.

The step of determining a corrected command determines, in an acquired image, the distribution of the diameters of the impact points of the calibration pattern that appears in said image, said corrected command being dependent on said distribution of the diameters of the impact points and being a focus command.

Such a method is advantageously completed by the various following features which may be implemented alone or in any technically possible combination thereof:

in the step of commanding the source, various shots corresponding to various impact points are generated with different focus commands;

in the step of commanding the source, various shots corresponding to various impact points are generated with focus commands that are incremented so that the diameters have a Gaussian distribution about the midpoint of the pattern;

the step of determining the corrected focus command determines, depending on the distribution of the diameters of the impact points, an impact point of smallest diameter or an extrapolated waist point;

the corrected command associated with the midpoint of a marking is the focus command for said impact point thus determined or the extrapolated command that corresponds to said extrapolated waist point;

the calibration pattern that the impact points form is a matrix array and the focus command value increases column after column and row after row;

the source is commanded with the head system in order to produce, on the calibration plate, a marking of a plurality of calibration patterns that are theoretically centred on preset theoretical target points;

in the acquiring step, an optical measurement device is moved over the calibration plate in order to acquire, for each reference mark of the calibration plate, at least one image of a zone in which are found on the one hand said reference mark and on the other hand the theoretical target position in immediate proximity;

for each reference mark, the one or more acquired images are processed in order to deduce therefrom the position of the impact point of smallest diameter or of an extrapolated waist point in an orthonormal coordinate system of said reference mark and to determine the offset between the position of said point and the theoretical target position and wherein a complementary correction is determined depending on this offset;

to determine a correction, processing is implemented to pass from a coordinate system of the calibration plate to a coordinate system attached to the head;

said processing identifies patterns corresponding to two given reference marks on the calibration plate and determines, from said identification, a translational offset and an angular rotation between the coordinate system of the calibration plate and a coordinate system attached to the head.

According to another aspect, furthermore, the invention provides an assembly for calibrating a head system of a power radiation source of an additive manufacturing apparatus comprising:

a calibration plate comprising a plurality of reference marks, a firing medium made of at least one material that is sensitive to the radiation of the source, this medium leaving visible the reference marks of the calibration plate when it is in place on the latter, characterized in that the firing medium comprises a plurality of windows that are distributed thereover so as to be superposed with the various reference marks of the calibration plate and to leave said marks visible when the firing medium is in place on the calibration plate.

PRESENTATION OF THE FIGURES

Other features and advantages of the invention will become more clearly apparent from the following description, which is purely illustrative and nonlimiting, and must be read with reference to the appended figures, in which.

Figure 1:
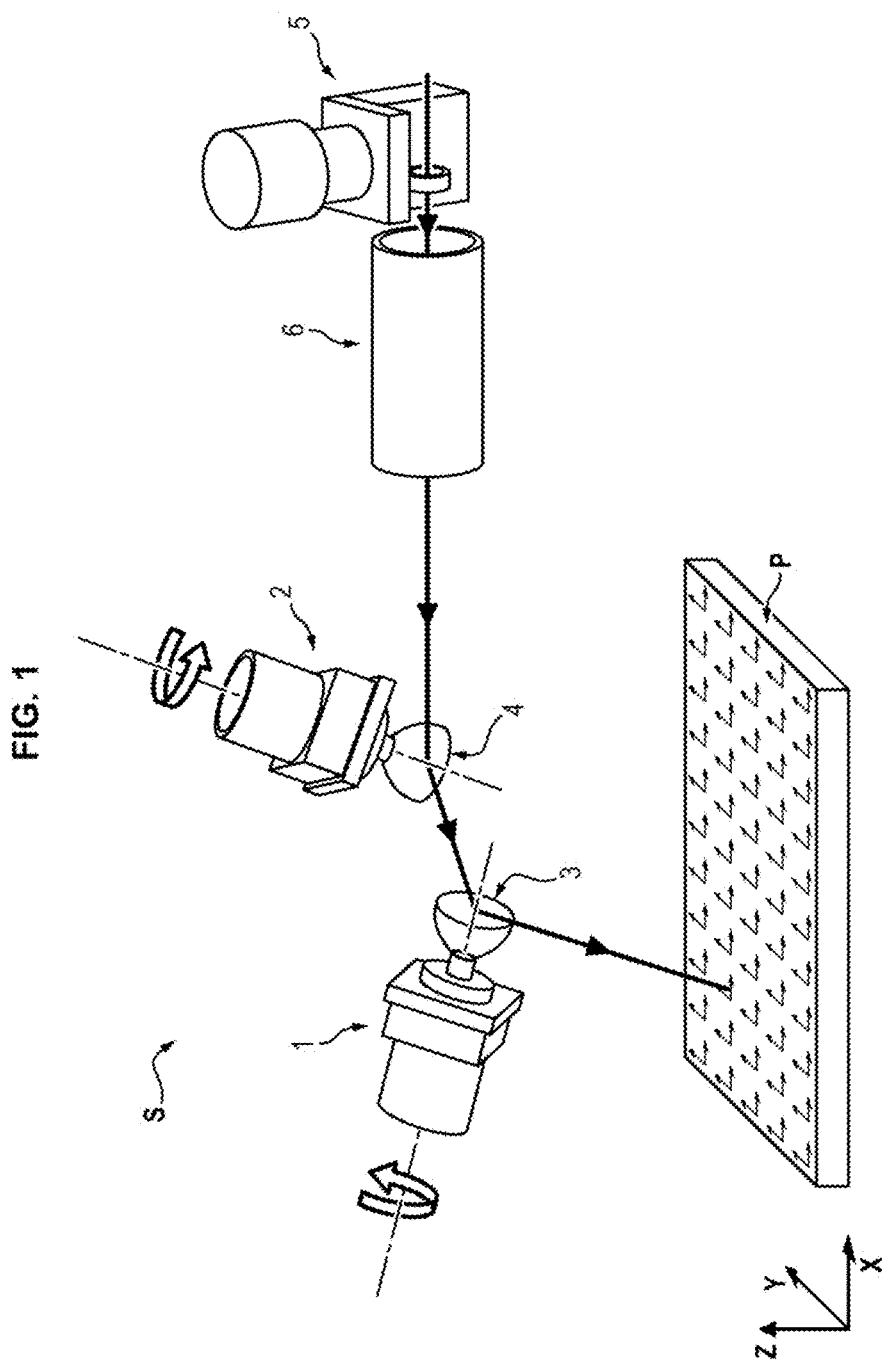
FIG. 1 is a schematic representation of the optical chain of a three-axis head of a laser emission source of a selective manufacturing apparatus.
Figure 3:
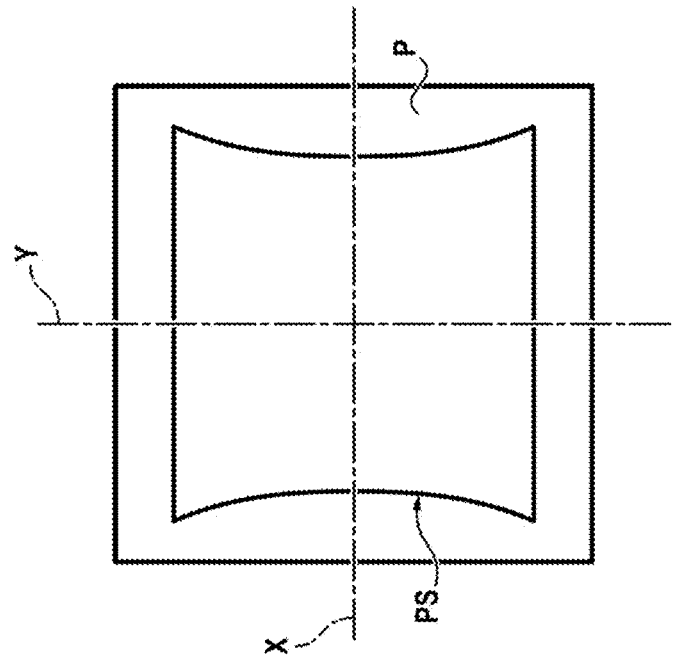
FIGS. 2 and 3 illustrate the main deformations in the absence of correction of such a device.
Figure 2:
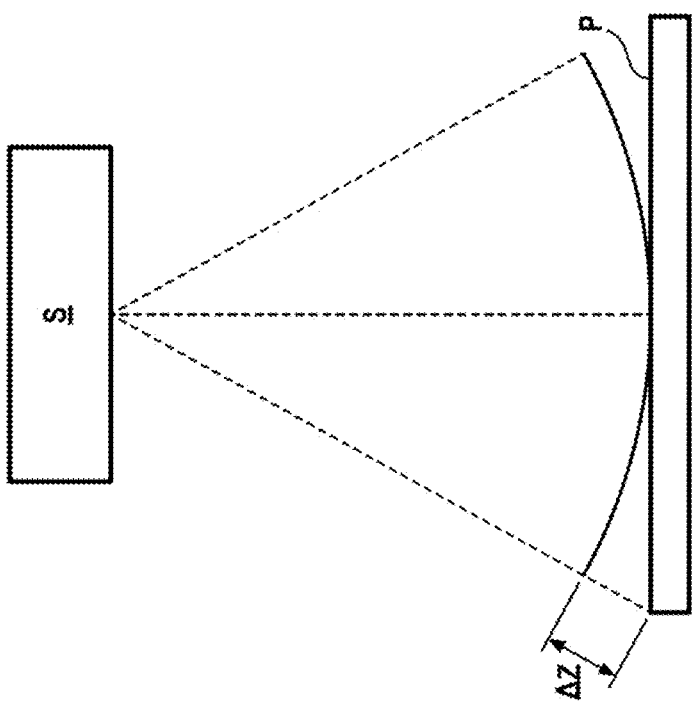
Figure 4B:
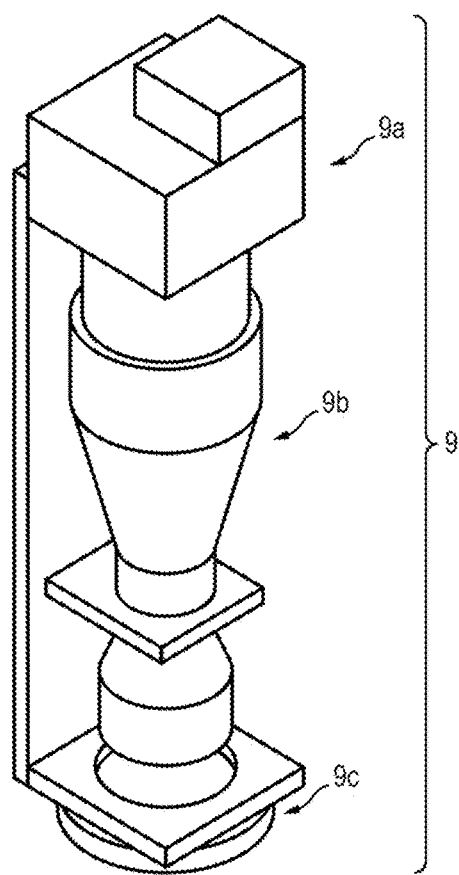
Figure 8A:
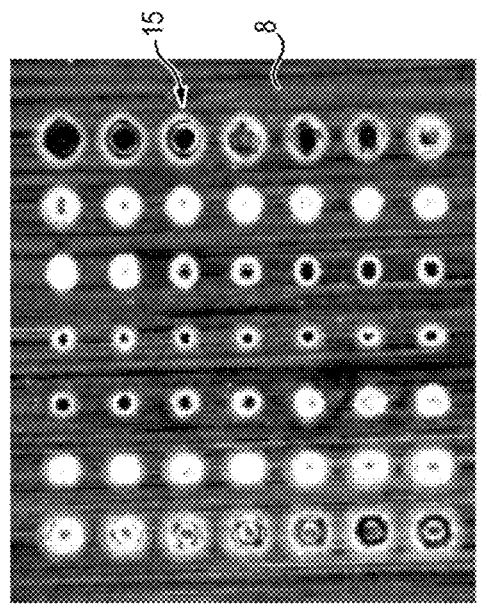
Figure 8B:
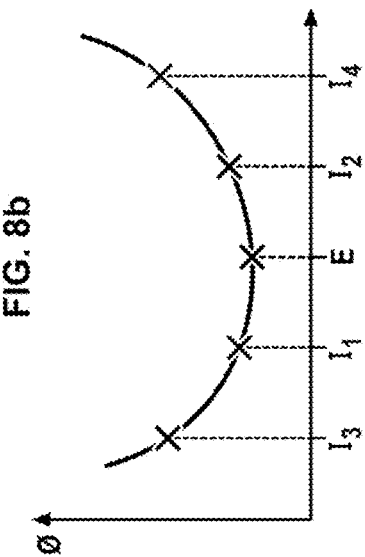
Figure 7:
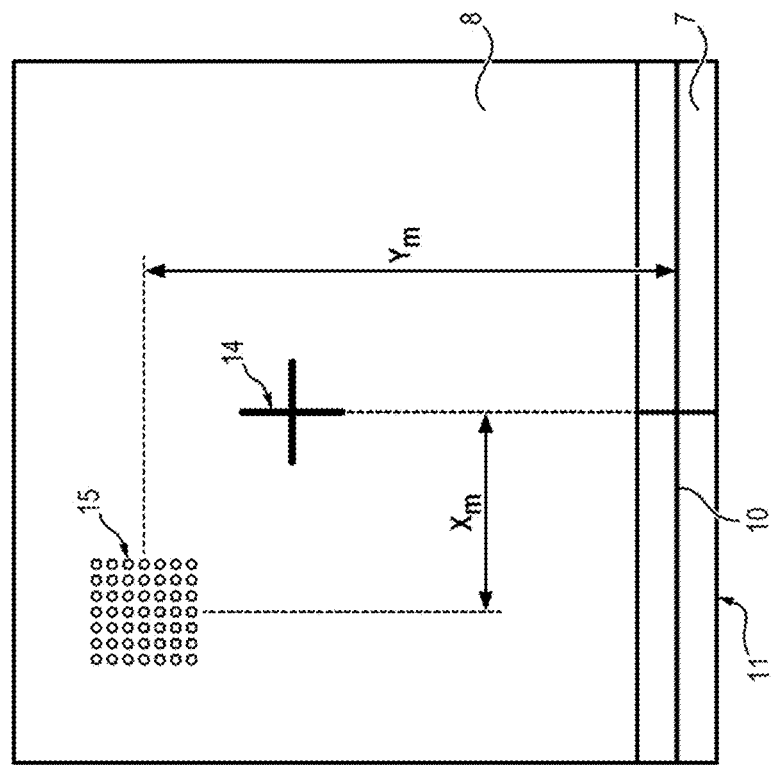
Figure 9:
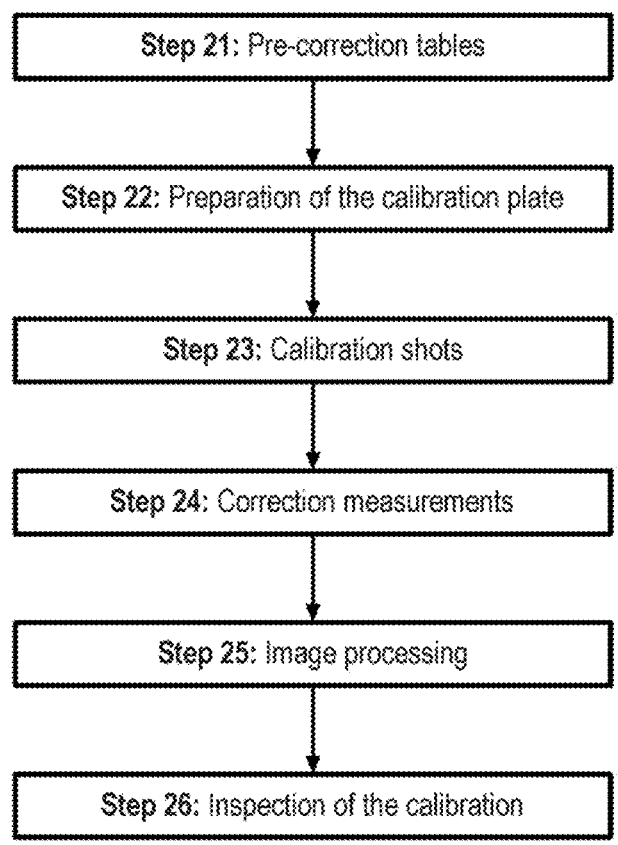
Figure 10:
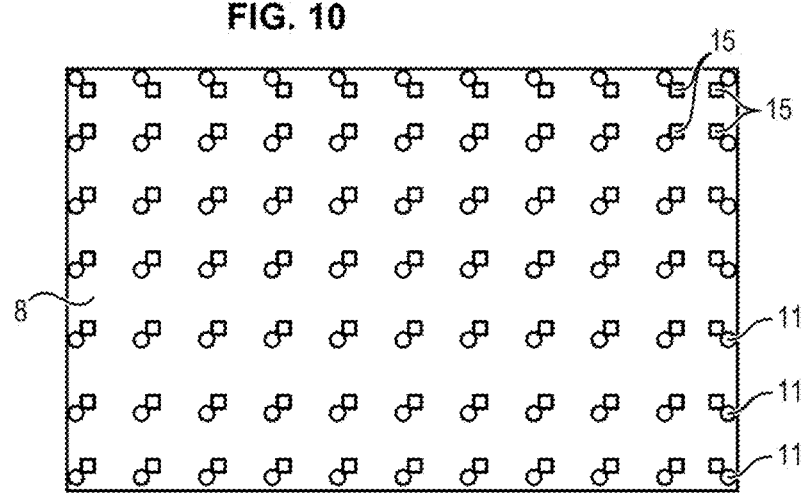
Figure 15:
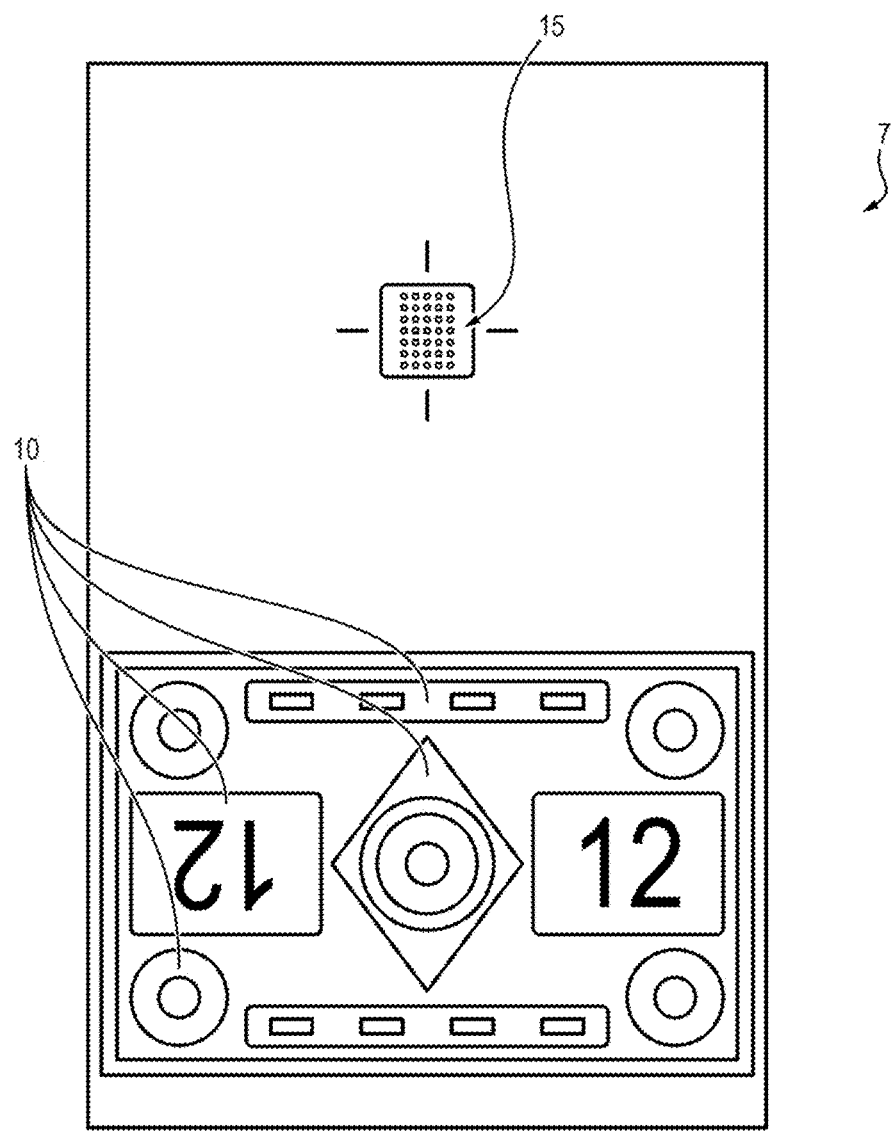

FIG. 4a schematically illustrates an example of a calibration assembly (kit) according to the invention, FIG. 4b for its part detailing the elements of the optical assembly of this calibration assembly;

FIG. 5 is a schematic representation illustrating the superposition of a calibration plate and a firing medium;

FIG. 6 schematically illustrates a double-axis railed holder on which the measuring equipment of the assembly of FIG. 4a is intended to be mounted;

FIG. 7 illustrates the image in the measurement field of the camera of the assembly of FIG. 4a;

FIG. 8a illustrates the impact points on the firing medium level with a calibration pattern;

FIG. 8b illustrates a Gaussian distribution of the impact points and the determination of an extrapolated waist point;

FIG. 9 illustrates various steps of one possible implementation of the method of the invention;

FIG. 10 illustrates a firing medium presenting the impacts of various firing patterns;

FIGS. 11 to 14 illustrate the processing carried out to pass from the coordinate system of the plate to the coordinate system of the head;

FIG. 15 illustrates the image in the measurement field of the camera of a calibration assembly according to the invention.

DESCRIPTION OF ONE OR MORE IMPLEMENTATIONS AND EMBODIMENTS

Calibration Assembly

The calibration assembly of FIGS. 4a, 4b and 5 is a kit that comprises a calibration plate, referenced 7, and a firing medium 8.

It also comprises a piece of optical-sensor-based inspection equipment 9.

The reference plate 7 is a platen on which are visibly borne a plurality of reference marks 10. Preferably, the reference marks 10 are present on both faces of the reference plate 7, in order that the latter can be flipped and both sides thereof used.

These reference marks 10 are distributed over all of the plate in known and controlled positions. By way of example, they may be located close to points of a 65×65 matrix array all or some of which is intended to be scanned by the power radiation source during the calibration. Other distributions are of course possible.

At each reference point, the visible marking of the mark 10 is defined by two orthogonal axes, the intersection of which corresponds to the reference point and that define on the plate an orthonormal coordinate system.

The firing medium 8 is optional. In a first embodiment, there is no firing medium 8. Preferably, the reference plate 7 is a glass platen, which may have a thickness comprised between 0.1 mm and 10 mm, and preferably of 1 mm.

In a second embodiment, the firing medium 8 is present, and consists of a film made of a material sensitive to the radiation beam.

This medium 8 is of same dimensions in X and in Y as the plate 7 and is positioned on the latter during the calibration shots.

This medium 8 contains a plurality of windows 11 that are distributed in the same way as the reference marks 10 over the plate 7. When the firing medium 8 is in place on the plate 7, the windows 11 are centred on the reference marks 10 that are therefore visible.

The equipment 9 comprises a CMOS or CCD camera 9a, an optical objective 9b and a specific lighting system 9c.

The specific lighting system 9c for example consists of a ring of light-emitting diodes. The camera 9a and the objective 9b allow an image of a resolution permitting measurements with a tolerance close to one micron to be taken.

This equipment 9 is for example integrated into the selective printing apparatus.

As a variant, it may be placed in the interior thereof only during calibration phases.

Provision is made, in the apparatus for manufacturing by selective printing, for a double-axis railed holder 12 such as shown in FIG. 6, which receives the equipment 9 and the camera 9a. This system 12 allows manual or automated guidance in X and in Y of the equipment 9 and of the camera 9a above the calibration plate 7 and the medium 8 if the latter is present.

The various images taken are processed by a computer 13 in order to deduce therefrom the measurements described below. This computer 13 is for example the computer of the selective printing apparatus. It may also be a computer that is separate from that of the selective printing apparatus and that exchanges therewith.

Measurement of Defects

During a calibration, the camera 9a acquires, for each of the various reference marks 10, an image in which the orthonormal marking that corresponds to said mark 10 appears (FIG. 7).

The marking corresponding to a mark 10 of the reference plate 7 may, as illustrated in FIG. 15, comprise a plurality of elements of various sizes and of various shapes in order to improve the precision of the location, and may mention the number of the reference plate 7.

In the second embodiment, the markings of each of the reference marks 10 are left visible by virtue of the windows 11 of the firing medium 8, which may for example be rectangular apertures, other shapes of course being possible.

Such a reference marking 10 defines, on the calibration plate 7, an orthonormal measurement coordinate system that serves as reference for the camera 9b.

Prior to the acquisition of the images, the source and its head system S are commanded to shoot, for each reference mark 10, at a given theoretical target position in proximity to the corresponding reference mark 10.

In the first embodiment, this shooting is directed directly at the reference plate 7. In the second embodiment, this shooting is directed at the medium 8.

A target position marking may be produced on the reference plate 7 in proximity to the given theoretical target position, in order to improve the location of the position of the shooting and therefore the precision of the calibration. As illustrated in FIG. 15, the target position marking may be centred on the given theoretical target position. It may consist of a square framing the given theoretical target position of the shooting, the square possibly being surrounded by a cross formed from horizontal and vertical lines.

The shooting is carried out at a succession of a plurality of firing points that are distributed in a predefined firing pattern (matrix-array pattern 15 of 7×7 points in the example of FIG. 7).

In FIG. 7, the theoretical target position (not shown) corresponds to the cross 14.

At the end of the pattern shooting, images are acquired around each reference marking 10.

For each of these markings 10, the acquired image of the zone therearound is processed by the computer 13 in order to deduce therefrom the position of the centre (midpoint) of the firing pattern 15 in the orthonormal coordinate system of said marking 10 (Xm and Ym position measurements) and therefore the offset of this position with respect to the theoretical target position 14.

Moreover, as illustrated in FIG. 8a, the shots at the various points of the pattern 15 are commanded to generate various diameters at the impact points of said pattern.

For example, a plurality of these shots are generated with various commands in Z, i.e. with different focus commands. Typically, the command in Z of these various shots is incremented from one point to the next in order to theoretically obtain a Gaussian distribution about the midpoint of the pattern.

In the example in FIG. 8a, the Gaussian distribution is a distribution with an axis of symmetry in Y.

As a variant, this distribution may be Gaussian both in X and in Y (two-dimensional Gaussian distribution).

An example of distribution of incrementations is given in the following table. The firing pattern is a matrix array and the command value in Z increases column after column (in the present case from left to right) and row after row (from bottom to top).

| | | | | | | |
|---|---|---|---|---|---|---|
| ... | ... | −4 Δ | +3 Δ | ... | ... | ... |
| ... | ... | −5 Δ | +2 Δ | +4 Δ | ... | ... |
| ... | ... | −6 Δ | + Δ | +3 Δ | ... | ... |
| ... | ... | −7 Δ | 0 | + Δ | ... | ... |
| ... | ... | −8 Δ | − Δ | −3 Δ | ... | ... |
| ... | ... | −9 Δ | −2 Δ | +5 Δ | ... | ... |
| ... | ... | ... | −3 Δ | +4 Δ | ... | ... |

The central increment point 0 corresponds to the midpoint of the pattern, whereas Δ corresponds to the unitary command increment value in Z. In the case (given solely by way of example) of a 7×7 firing matrix array, it is thus possible to test 49 command values in Z.

Once the pattern has been generated, the processing implemented by the computer 13 analyses the distribution of the diameters of the impact points and determines, depending on this distribution, the point of the zone of the pattern that corresponds to the "waist".

This "waist" point corresponds to an impact point of smallest diameter or to an extrapolated point that is extrapolated based on the curves of the distribution of the diameters of the impact points.

In the example illustrated in FIG. 8a, various points of impact I1 to I4 and a curve G that is the Gaussian that best fits these points have been shown.

The extrapolated point is the point E corresponding to the minimum of said Gaussian G.

The command in Z for the impact point thus selected (or the extrapolated command that corresponds to the extrapolated point thus determined) is then applied as command for the theoretical target position of the marking (in the form of a correction $\Delta Zm$).

Complementarily, an optional correction to take into account the variation in optical path length between this theoretical target point and the impact point of smallest diameter or the impact point determined as corresponding to the waist may also be applied.

This correction is for example determined by referring to charts giving this complementary focus correction as a function of the measurement of the distance between the theoretical target point and the impact point of smallest diameter or the impact point determined as corresponding to the waist.

It will be understood that such processing is particularly facilitated in the case where the impact points together form a matrix-array calibration pattern. Other calibration-pattern configurations are of course possible.

The measurements Xm and Ym are then processed in order to deduce therefrom the correction values $\Delta X$ and $\Delta Y$ in bits necessary to apply in the head command system S for the pattern 15 to, during a subsequent calibration shooting, be centred on the target position 14.

In the same way, the correction $\Delta Z$ to be applied to the DFM to correct the focus is determined depending on Xm, Ym and $\Delta Zm$ and loaded in bits into said module.

By way of order of magnitude, the galvanometers of the three-axis head are typically commanded over 24 bits (i.e. guidance for each of the axes over $2^{24}$ bits), whereas the pitch in X, Y on a correction grid is distributed over 4225 values (pitch of 262 144 bits). The Z-command is for its part also commanded over 24 bits, the correction table having the same dimension as for X and Y.

It will furthermore be noted that a matrix-array pattern of the proposed type is particularly advantageous and allows a precision calibration, both as regards the position of the firing points and as regards the focus of the radiation beam on the powder bed. Other patterns are nevertheless possible (matrix-array patterns with a staggered distribution, circular patterns, elliptical patterns, etc.).

Calibration Steps

In a first step (step 21 in FIG. 9), tables of pre-corrections along the three axes are loaded into the computer 13.

These tables are obtained beforehand using theoretical models. This allows defects related to the optical chain to be removed to a large extent. Thus, it is possible to fire calibration shots in a very restricted zone compatible with the field of view of the camera and with a sufficient focus to remove material.

In a second step (step 22), the plate 7 is placed in the apparatus for manufacturing objects by selective printing. The calibration plate 7 is dimensioned to allow it to be directly and easily placed on the plate-holding system of said apparatus.

In the second embodiment, the firing medium 8 is positioned on the calibration plate 7.

In a third step (step 23), the beam source and the head are commanded to shoot a succession of patterns at various theoretical target points 14. In the first embodiment, the succession of shots is directed at the reference plate 7. In the second embodiment, the succession of shots is directed at the medium 8.

The theoretical target points are chosen to correspond to points that are similar to all or some of the reference marks on the calibration plate.

The use of a matrix array of theoretical points corresponding to the matrix array of points used for a correction table allows the influence of the correction to be limited.

The number of reference points used may nevertheless be lower than the number of points of the correction table that it is sought to determine. In this case, the missing points may be extrapolated from results relating to the targeted points.

In the second embodiment, the shots of the patterns are targeted at 7.5 mm from the plate in Y in order to shoot at the material of the medium 8 and not at the windows 11, so that the impacts will be visible on the medium 8 and measurable with the camera 9b (FIG. 10).

In a fourth step (step 24 of FIG. 9), the measurement equipment 9 is introduced into the selective printing apparatus in order to perform correction-enabling optical measurements.

By virtue of the two-axis holder 12, the operator moves, manually or using motorized means, said equipment 9 in order to acquire, successively, images of all of the various firing points. In the first embodiment, the firing points are located on the reference plate 7. In the second embodiment, the firing points are located on the medium 8. It will be noted that the calibration plate 7 may bear numbering in the vicinity of the various reference marks 10, so that the scanning may be carried out without a measurement order being imposed on the reference marks.

The images thus acquired may be processed in real-time by the computer 13 (step 25) or stored for subsequent processing.

The measurements and processing are carried out in the following way.

The analysis of an image of a given reference mark allows the coordinates Xm and Ym of the point at the centre (middle) of the firing pattern to be determined.

It also allows the correction value $\Delta Zm$ to be determined.

The mechanical positioning of the head with respect to the calibration plate 7 cannot be ensured to within a micron, and the computer 13 implements a processing operation to change coordinate system, which allows the measurements to be transferred to the coordinate system of the head.

Figure 11:
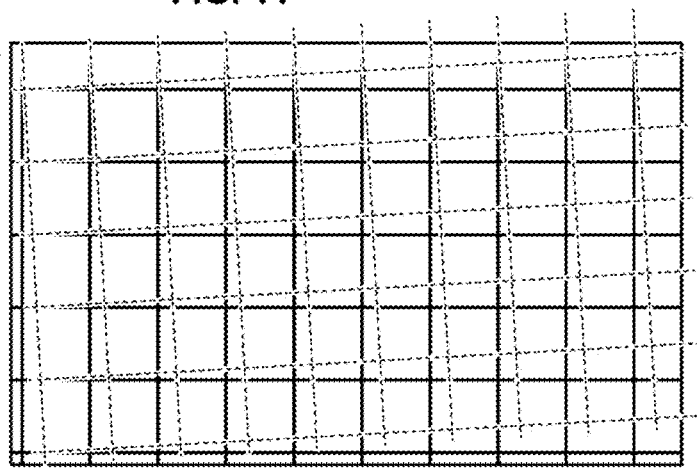

FIG. 11 illustrates in an exaggerated way the translational and rotational offset that may exist between the two coordinate systems.

Figure 12:
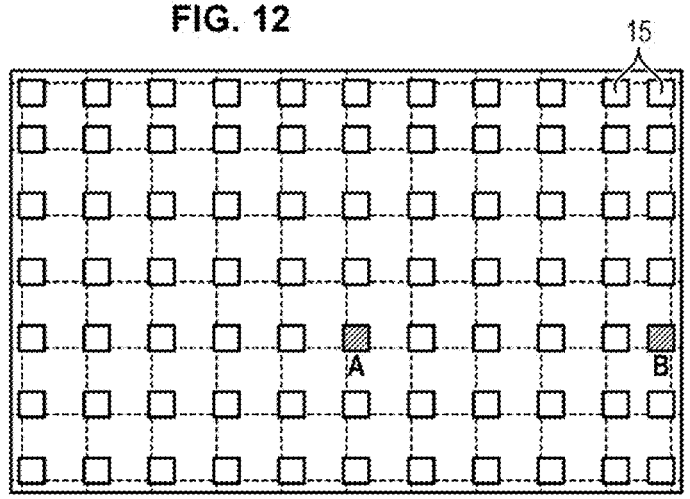

To evaluate the translational offset, the centre (midpoint) of one of the patterns is used as reference point (point A in FIG. 12).

This point is preferably chosen to be located under the head of the source (coordinates (0,0) in bits of the galvanometers commanding the head in X and in Y).

The processing of the image corresponding to the reference mark 10 allows the computer to determine the position Xm0 and Ym0 of the corresponding point in the coordinate system of the plate and to deduce therefrom the translational correction to be applied to the measurements in order to transfer them to the coordinate system of the head.

To evaluate the rotational offset, the computer 13 uses the patterns corresponding to point A and to a second firing point (point B in FIG. 12) theoretically located in the same row in X as the point A.

The Y-command of the mirror being zero for these two positions, the vector connecting these two points is therefore the horizontal of the head coordinate system.

Figure 13:
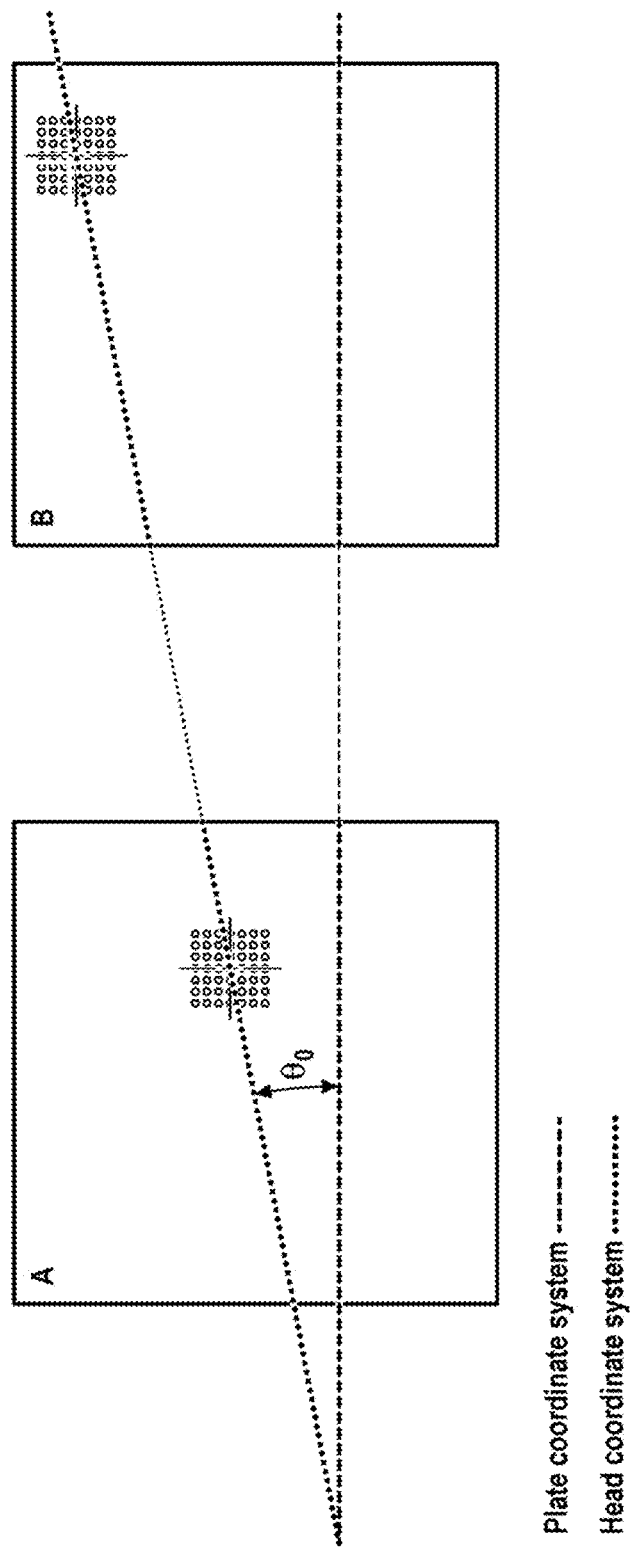

The position of the point B in the coordinate system of the plate 7 allows the computer to determine the angle θ0 between the coordinate system of the plate and the coordinate system of the head system S (FIG. 13).

Using these parameters, the computer 13 makes the sought-after change of coordinate system for all of the recorded images.

Thus, for each measurement point of coordinates Xm and Ym, it determines the corresponding coordinates Xmt and Ymt in the coordinate system of the head system.

These measurements are then processed in order to obtain the correction values in bits of the command (in X and in Y) of the movements of the two mirrors.

Figure 14:
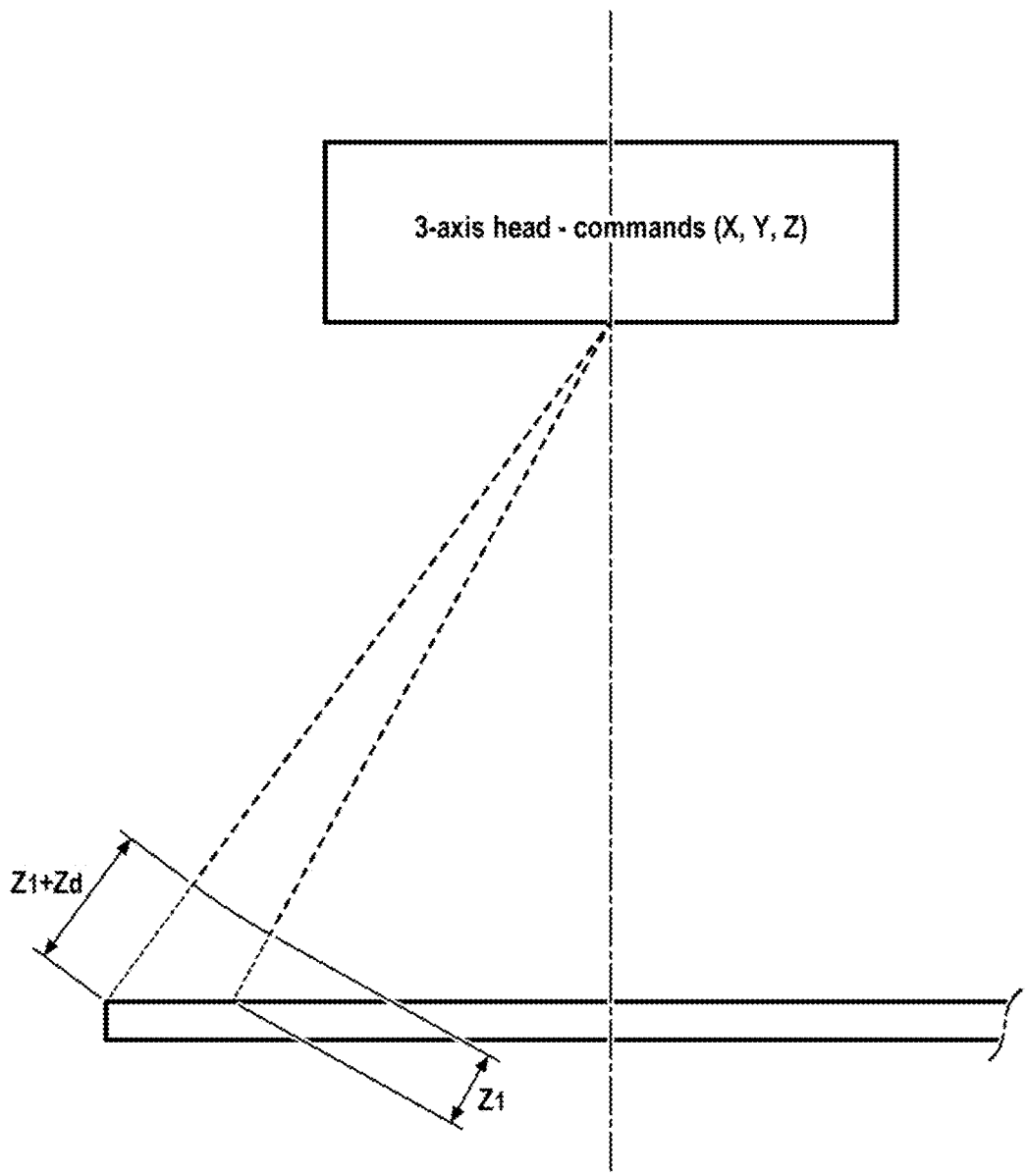

This correction in X and in Y itself engenders a movement of the impact point over the plate 7 and therefore a variation in focus (variation corresponding to Zd in FIG. 14). The computer 13 estimates this variation Zd by virtue of optical laws and determines the corresponding galvanometer value in bits (ΔZd).

For each pattern 15 (i.e. for each calibration point), this correction is added to the corrected command value in Z determined by the computer 13 for the pattern in question, in order to deduce therefrom the correct calibration value in Z.

Once the corrections have been established, the computer 13 stores the new correction table in memory.

The apparatus is then ready for an inspection shooting (step 26).

In the first embodiment, once the correction table thus obtained, the calibration plate 7 is flipped and the operator triggers a new sequence of inspection shots. The position of the impacts (firing patterns) on the calibration plate 7 is noted and new corrections are determined by the computer 13.

In the second embodiment, once the correction table thus obtained, the firing medium 8 is flipped and the operator triggers a new sequence of inspection shots. The position of the impacts (firing patterns) on the firing medium 8 is noted and new corrections are determined by the computer 13.

A test ratio may where appropriate be calculated.

If the inspection test returns a focal and positioning precision that is insufficient with respect to the expected precision, a new correction table may be computed, followed by a new inspection shooting.

The process is thus iterated until the calibration is considered to be sufficient to respect expected positioning tolerances.

The invention claimed is:

1. A method for calibrating a head system of a power radiation source of an additive manufacturing apparatus, the method determining a correction to be applied to commands of the head system, and the method comprising the following steps:

positioning in the additive manufacturing apparatus a calibration plate comprising a plurality of reference marks;

commanding the power radiation source to mark on the calibration plate at least one calibration pattern formed of a plurality of impact points;

acquiring at least one image of the at least one calibration pattern and of at least one reference mark;

determining at least one corrected command depending on the at least one image acquired, wherein the step of determining the at least one corrected command determines, in the at least one image acquired, a distribution of diameters of the impact points of the at least one calibration pattern that appear in the at least one image, the at least one corrected command being dependent on the distribution of the diameters of the impact points and being a focus command; and determining, depending on the determined distribution of the diameters of the impact points, a point of the calibration pattern that corresponds to a waist point, the waist point being an impact point of smallest diameter or an extrapolated point that is extrapolated based on curves of the determined distribution, wherein the at least one corrected command is determined based on a focus command for the waist point.

2. The method according to claim 1, wherein, in the step of commanding the power radiation source, shots corresponding to impact points are generated with different focus commands.

3. The method according to claim 2, wherein, in the step of commanding the power radiation source, shots corresponding to impact points are generated with focus commands that are incremented so that diameters have a Gaussian distribution about a midpoint of the at least one calibration pattern.

4. The method according to claim 1, wherein the at least one calibration pattern that the impact points form is a matrix array and the focus command value increases column after column and row after row.

5. The method according to claim 1, wherein the power radiation source is commanded with the head system in order to produce, on the calibration plate, a marking of a plurality of calibration patterns that are theoretically centered on preset theoretical target points.

6. The method according to claim 5, wherein, in the acquiring step, an optical measurement device is moved over the calibration plate in order to acquire, for each reference mark of the calibration plate, at least one image of a zone in which are found the reference mark and a theoretical target position in immediate proximity.

7. The method according to claim 5, wherein, for each reference mark, the at least one image acquired is processed in order to deduce a position of an impact point of smallest diameter or of an extrapolated waist point in an orthonormal coordinate system of the reference mark and to determine an offset between the position of the impact point of smallest diameter and the theoretical target position, and wherein a complementary correction is determined depending on the offset.

8. The method according to claim 1, wherein, to determine a correction, processing is implemented to pass from a coordinate system of the calibration plate to a coordinate system attached to a head.

9. The method according to claim 8, wherein the processing identifies patterns corresponding to two reference marks on the calibration plate and determines, from the identification, a translational offset and an angular rotation between the coordinate system of the calibration plate and the coordinate system attached to the head.

10. The method according to claim 1, wherein the impact points are substantially circular.

11. The method according to claim 1, wherein the calibration pattern is a matrix array having at least two lines.

* * * * *